(12) United States Patent
Cohen

(10) Patent No.: US 7,179,011 B1
(45) Date of Patent: Feb. 20, 2007

(54) INTEGRATED LOCKING DEVICE

(75) Inventor: Murray Cohen, 605 Spring Lake Dr., Middle Island, NY (US) 11953-2663

(73) Assignee: Murray Cohen, Middle Island, NY (US)

( * ) Notice: Subject to any disclaimer, the term of this patent is extended or adjusted under 35 U.S.C. 154(b) by 0 days.

(21) Appl. No.: 10/938,499

(22) Filed: Sep. 13, 2004

(51) Int. Cl.
*F16D 1/00* (2006.01)

(52) U.S. Cl. .................................................. 403/315

(58) Field of Classification Search .......... 403/293, 403/296, 301, 306, 307, 315, 316, 319, 327, 403/329; 411/119–121
See application file for complete search history.

(56) References Cited

U.S. PATENT DOCUMENTS

| | | | |
|---|---|---|---|
| 2,648,997 A | | 8/1953 | Sawyer |
| 4,085,623 A | | 4/1978 | Yuda |
| 4,126,057 A | | 11/1978 | von Allwoerden et al. |
| 4,232,978 A | | 11/1980 | Cohen |
| 4,274,754 A | | 6/1981 | Cohen |
| 4,295,389 A | | 10/1981 | Geisthoff et al. |
| 4,684,284 A | | 8/1987 | Bradley, Jr. |
| 4,778,194 A | | 10/1988 | Koch et al. |
| 5,076,369 A | | 12/1991 | Herchenbach |
| 5,265,141 A | | 11/1993 | Kobsa |
| 5,275,443 A | * | 1/1994 | Klinger ................... 285/82 |
| 5,362,110 A | | 11/1994 | Bynum |
| 5,562,378 A | | 10/1996 | Blechschmidt et al. |
| 5,681,136 A | | 10/1997 | Blair |
| 5,765,957 A | * | 6/1998 | Connell .................. 403/46 |
| 6,264,411 B1 | * | 7/2001 | DiStasio et al. ........ 411/329 |
| 6,302,447 B1 | * | 10/2001 | Lee ........................ 285/86 |
| 6,957,833 B2 | * | 10/2005 | Guest ..................... 285/322 |

OTHER PUBLICATIONS

"Aircraft Device Locks Twice" circle 412 and circle 74, Feb. 21, 1994.
M. Cohen "Machine Design Proven America's Most Useful Design Engineering Magazine" pp. 92-96 1994.

* cited by examiner

*Primary Examiner*—Daniel P. Stodola
*Assistant Examiner*—Joshua T. Kennedy
(74) *Attorney, Agent, or Firm*—Nixon Peabody, LLP

(57) ABSTRACT

A locking device to securely connect a first fitting to a second fitting is provided. An actuator piston and rod-end locking device for locking a first fitting to a second fitting comprises a locking support body mounted on the first fitting, the locking support body positioned in engagement with the second fitting to prevent rotation of the second fitting, a shelf element mounted on the locking support body, the shelf element extending over the second fitting, and a fastening member mounted on the shelf element and interposed radially between the shelf element and the second fitting, the fastening member capable of pivotal movement relative to the shelf element, wherein the fastening member pivots relative to the shelf element into engagement with the second fitting to secure the locking support body to the second fitting.

16 Claims, 7 Drawing Sheets

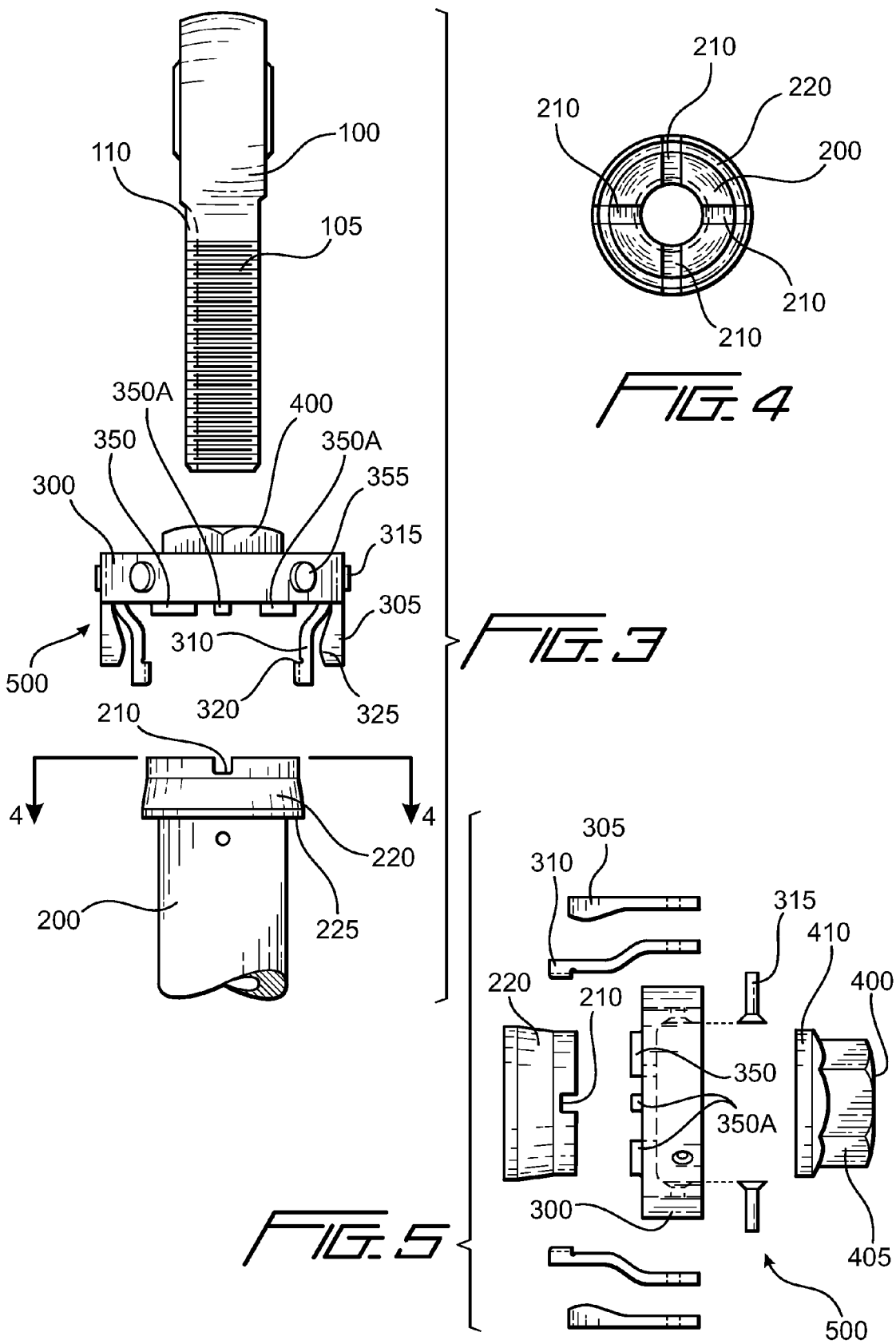

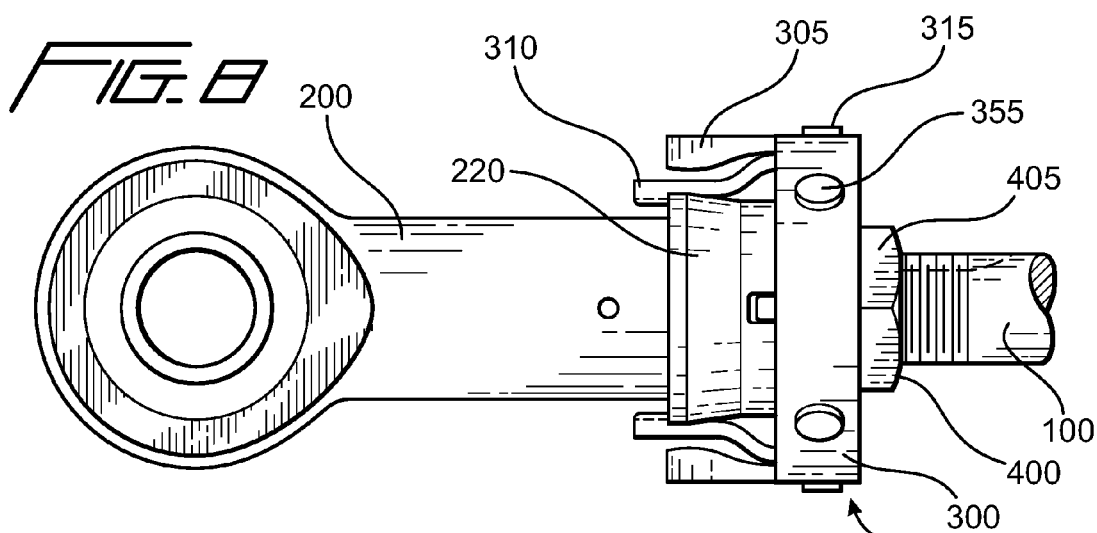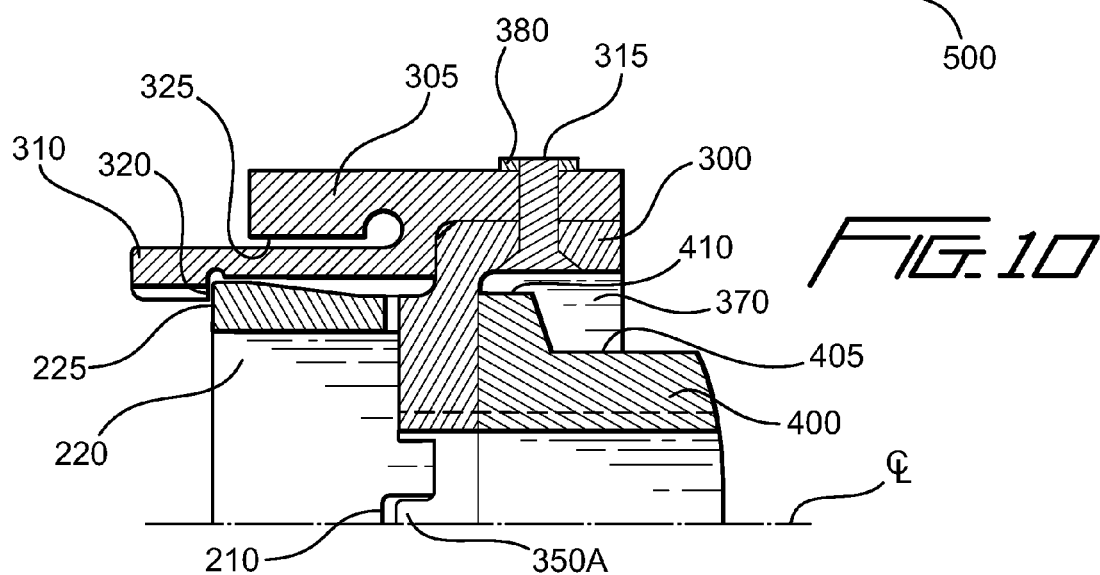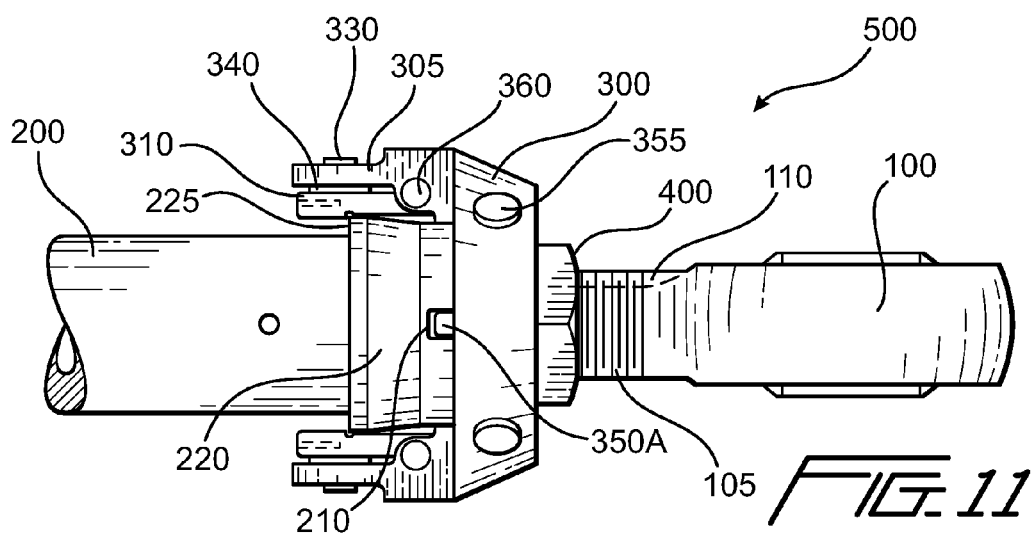

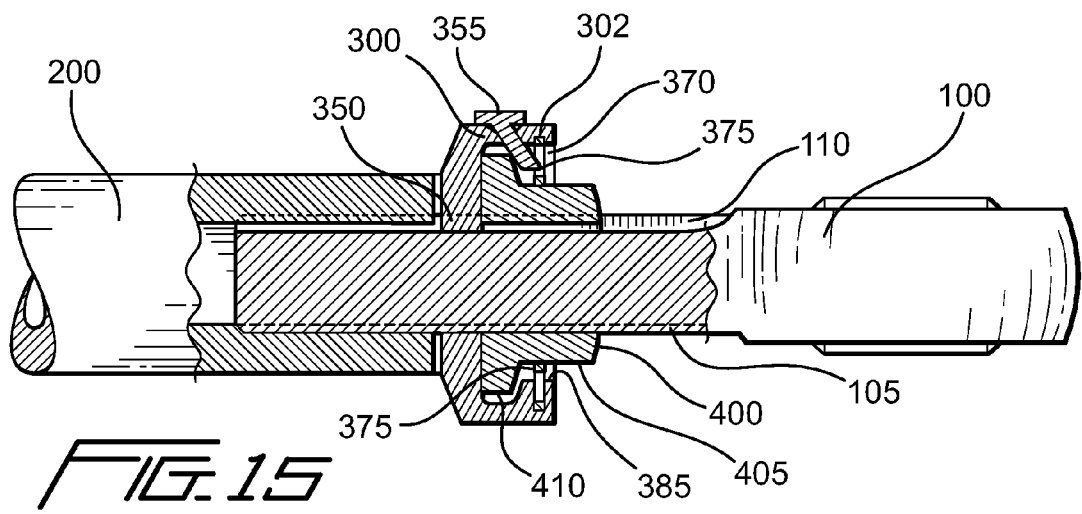
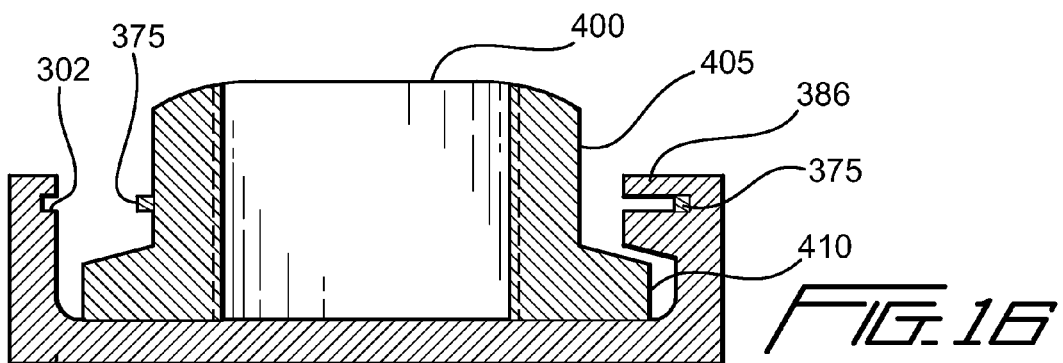
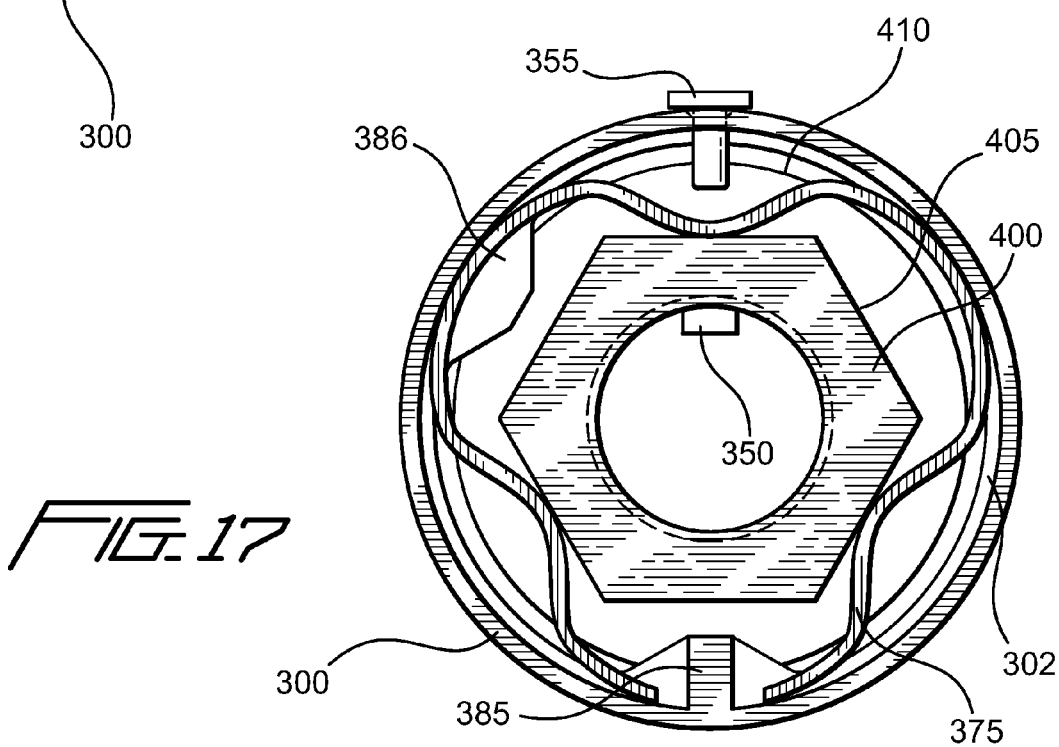

INTEGRATED LOCKING DEVICE

BACKGROUND OF THE INVENTION

1. Technical Field

This invention relates generally to a locking device for locking one end of a rod to an end of an element to prevent inadvertent separation and, specifically, to such a device for use in the airline industry.

2. Description of Related Art

Most military and commercial aircraft utilize combinations of bellcranks, push/pull rods, bungees (spring loaded pushrods) and hydraulic actuators to operate flight controls and landing gear systems. Since bungees and hydraulic actuators have a tendency to produce relative rotary motion during operation, system integrity has frequently depended upon anti-rotation locking devices to prevent such motion. Those skilled in the art strive to meet the specifications of military and government regulations for airline safety. The specifications and regulations that govern the design and construction of aircraft systems include MIL-F-9490 General Specification for Flight Control System Design Installation and Test of Piloted Aircraft (U.S. Air Force), General Specification for Design and Construction of Aircraft Weapon Systems SD24L (U.S. Navy), Military Specifications MIL-F-18372 Flight Control Systems: Design, Installation and Test of Aircraft, and the Code of Federal Regulations 14, Aeronautics and Space. The invention is in strict compliance with the above-noted specifications and regulations, whereas existing standard rod end locking devices may not be in strict compliance.

These standards attempted to preclude human error of installation by providing tabs, slots, and grooves to integrate the locking devices. However, the installation of components such as those described above can be forced, with the assembly of the elements being incorrect regardless of the efforts made to ensure correct installations. It has been reported that over one-third of aircraft inspected for standards compliance contained improperly assembled components, and over one-fourth of these were critical linkages. A disconnect of only one component can cause a loss of linkage from pilot to control members. The consequence of such a failure could result in uncontrollable flight or an uncontrollable landing, and possibly the subsequent loss of an airplane.

For example, existing locking devices are highly dependent upon safety wire that is designed to prevent a jam nut from backing off. If the jam nut backs off, the locking device may eventually disconnect due to vibration. It is possible for a technician to improperly install standard rod-end locking devices backwards, neglect to tighten any jam nuts with sufficient torque, or inadvertently omit safety wiring. Additionally, the components may be incorrectly assembled with tabs and slots being misaligned. Moreover, any exposure of the locking device to lubricants, such as oil or grease, can reduce the friction between the piston rod and any jam nuts, thereby accelerating the loosening of those components. Any of these mistakes could result in a catastrophic failure because failure of a locking device can lead to a total failure of a particular control system. Loss of a control system can render a pilot helpless and leave the aircraft uncontrollable.

U.S. Pat. No. 5,362,110 issued on Nov. 8, 1994 to Bynum discloses a capture device that prevents vibrational disassembly of fluid tubing couplers and fasteners for hydraulic, pneumatic, and fuel systems on aircraft. Two components of a coupling are held together when a capture device on one component engages a shoulder on the second component. The capture device and the shoulder act to prevent axial separation of the two components. However, rather than latch and spring components, the capture device consists of tangs which depend on the stiffness of the tang material to lock onto the other component. In addition, the purpose of the tangs is not preventing axial separation but preventing relative rotation by creating a ratcheting effect with the second component. Furthermore, no mechanisms operate independently of the tangs in case the tangs fail or are not properly engaged. Also, only the torque from a wrench is necessary to disengage the capture device. For example, spring locks do not need to be compressed to unlock the components.

U.S. Pat. No. 4,684,284 issued on Aug. 4, 1987 to Bradley, Jr., discloses an anti-rotation lock assembly that uses wedge keys in combination with a jam nut. However, the patent does not disclose the use of a nut with a special locking thread form or other mechanism to resist backing off.

U.S. Pat. No. 4,232,978 issued on Nov. 11, 1980 to Cohen discloses a double locking device for securing actuator rods to rod-ends which precludes the possibility of disengagement by providing a double locking feature with safety wiring. However, the use of the double locking device requires significant modification to the existing components to be locked, and thus, is undesirable for many applications.

Similarly, U.S. Pat. No. 4,274,754 issued on Jun. 23, 1981 to Cohen discloses a double locking device with a jam nut feature that precludes the possibility of reverse assembly. However, since the device of the '754 patent uses the same core locking device as the '978 patent, the use of the double locking device also requires significant modification to the existing components to be locked, and thus, is undesirable for many applications.

SUMMARY OF THE INVENTION

The invention relates generally to a locking device for locking one end of a first fitting to a second fitting to prevent inadvertent separation and, specifically, to such a device for use in the airline industry. In particular, the invention provides, in part, a locking device including a plurality of novel locking components that can be used alone or in combination to protect against improper installation or failure during operation. The invention further incorporates a method of "forced assembly" to guarantee that the locks are properly assembled. The invention is also very versatile, and can be used on any configuration of male and female fittings. Moreover, the invention provides a single integrated assembly of all locking components rather than requiring the use of separate components.

One aspect of a preferred embodiment of the invention relates to an actuator piston and rod-end locking device and assembly for locking two fittings together comprising a first fitting and a second fitting connected to the first fitting, wherein the second fitting includes an edge portion. The locking device further includes a locking support body mounted on the first fitting wherein the locking support body is positioned in engagement with the second fitting to prevent rotation of the second fitting. The locking device also includes a shelf element that is mounted on the locking support body and extends over the second fitting, and a fastening member mounted on the shelf element and interposed radially between the shelf element and the second fitting. The fastening member pivots relative to the shelf element into engagement with the second fitting to secure the locking support body to the second fitting.

Another aspect of a preferred embodiment of the invention relates to an actuator piston and rod-end locking device and assembly for locking two fittings together, the locking assembly comprising a first fitting including an exterior threaded portion and a longitudinal groove, a second fitting including an interior threaded portion and an edge portion wherein the second fitting is threadably connected to the first fitting via the interior threaded portion. The locking assembly also includes a locking support body mounted on the first fitting and positioned in engagement with the second fitting. The locking support body includes a fastening member that is mounted on the locking support body and extends along the second fitting to overlap the edge portion of the second fitting wherein the fastening member is capable of pivotal movement relative to the locking support body. In addition, the fastening member is positioned adjacent to the edge portion of the second fitting to prevent axial separation between the first fitting and the second fitting upon an application of axial force tending to separate the first fitting and the second fitting.

Yet another aspect of a preferred embodiment of the invention relates to an actuator piston and rod-end locking assembly for locking two fittings together comprising a first fitting including an exterior threaded portion and a longitudinal groove and a second fitting including an interior threaded portion and an edge portion, wherein the second fitting is threadably connected to the first fitting via the interior threaded portion. The locking assembly also includes a locking support body mounted on the first fitting and positioned in engagement with the second fitting to prevent rotation of the second fitting relative to the first fitting. The locking assembly further includes a shelf element mounted on the locking support body that extends over the second fitting and a fastening member mounted on the shelf element and interposed radially between the shelf element and the second fitting to overlap the edge portion of the second fitting, wherein the fastening member pivots relative to the shelf element into engagement with the edge portion of the second fitting to secure the locking support body to the second fitting.

The actuator piston and rod-end locking devices and assemblies described above may further comprise a locking ring element threadably mounted on the first fitting, wherein the locking support body is positioned between the locking ring element and the second fitting. Moreover, the actuator piston and rod-end locking device may further comprise a means for biasing the fastening member away from the shelf element, such as a plurality of spring washers stacked in series between the fastening member and the shelf element. Additionally, the fastening member may be integral with the locking support body.

Yet another aspect of a preferred embodiment of the invention relates to an actuator piston and rod-end locking assembly for locking two fittings together comprising a first fitting having an exterior threaded portion threadably connected to a second fitting having an interior threaded portion. According to this aspect, a locking support body is mounted on the first fitting in a position of engagement with the second fitting, and a locking ring element is threadably locked onto the first fitting. When assembled, the locking support body is positioned between the locking ring element and the second fitting, and the locking ring element prevents axial separation between the locking support body and the second fitting upon an application of axial force tending to separate the first fitting from the second fitting. Additionally, the locking ring element may be positioned within a recessed portion of the locking support body, and retained therein by one or more retaining pins or by an expansion spring.

These and other features of the invention will become more apparent from the following detailed description of the invention when viewed in conjunction with the accompanying drawings.

BRIEF DESCRIPTION OF THE DRAWINGS

FIG. 3 is an exploded side view of the locking device assembly according to one aspect of preferred embodiment of the invention as applied to a male rod end.

FIG. 4 is a transverse view of the end of the second fitting according to one aspect of a preferred embodiment of the invention.

FIG. 5 is an exploded side view of the locking device assembly according to one aspect of a preferred embodiment of the invention.

FIG. 8 is a side view of the locking device assembly according to one aspect of a preferred embodiment of the invention as applied to a female rod end.

FIG. 10 is a magnified cross-sectional side view of the locking device assembly according to one aspect of a preferred embodiment of the invention.

FIG. 11 is a side view of the locking device assembly according to one aspect of a preferred embodiment of the invention as applied to a male rod end.

FIG. 15 is a side view of the locking device assembly according to one aspect of a preferred embodiment of the invention.

FIG. 16 is a cross-sectional view of the locking ring element and locking support body according to one aspect of a preferred embodiment of the invention.

FIG. 17 is a transverse view of the locking ring element and locking support body according to one aspect of a preferred embodiment of the invention.

DETAILED DESCRIPTION OF THE INVENTION

Figure 1:
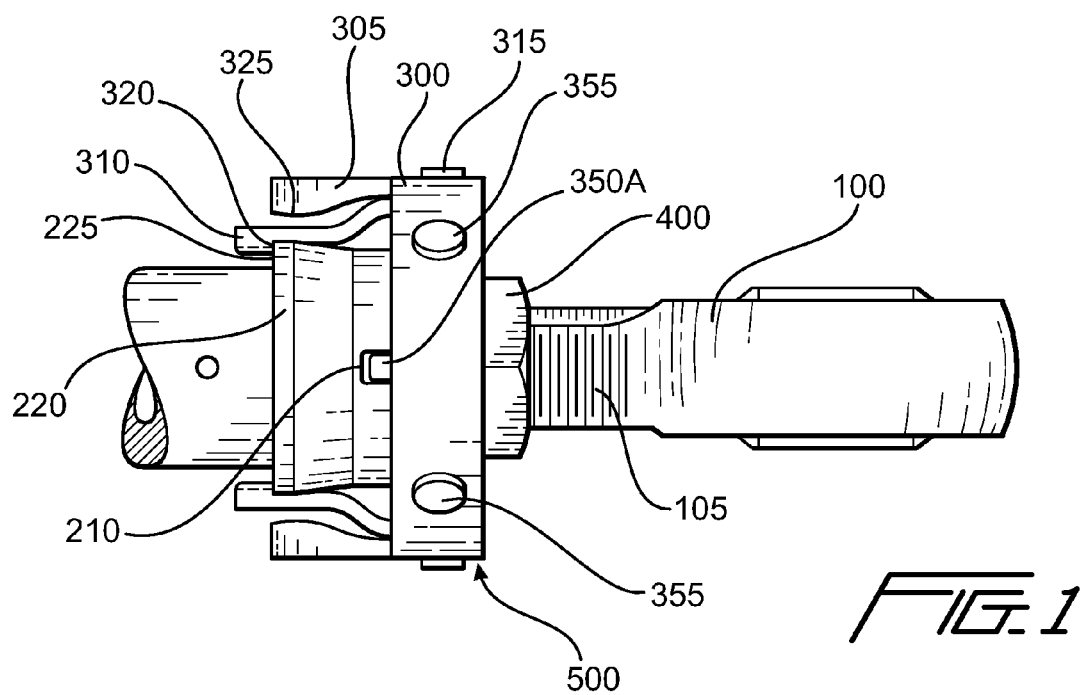
FIG. 1 is a side view of the locking device assembly according to one aspect of a preferred embodiment of the invention as applied to a male rod end.

Referring now to FIGS. 1–14, the invention provides a rod-end locking device 500 for locking a first fitting 100 to a second fitting 200. Locking device 500 preferably comprises a locking support body 300, a shelf element 305, a fastening member 310, a tab portion 350, and a bolt 315. The specific configuration of these components varies according to their use and the specific configuration and types of the fittings being connected. The invention described herein may be used with any type of suitable fittings. For example, in the airline industry, the invention may be used to connect a rod-end to a piston. This type of connection is described in detail in U.S. Pat. Nos. 4,232,978 and 4,274,754, the disclosures of which are hereby incorporated by reference.

First fitting 100 and second fitting 200 are rod-type fittings, such as actuator pistons and rod-ends. First fitting 100 is shown to be a rod-end portion in FIGS. 1–3 and 11, but may also be a piston portion, as is shown in FIG. 8. Accordingly, first fitting 100 is formed of steel, or any other suitable material, and the portion of first fitting 100 that is relevant to the invention is generally cylindrically shaped, with an external threaded portion 105. The distant end of first fitting 100 may be of any shape, but is shown in the figures to be either a rod-end or a piston. Threaded portions, such as external threaded portion 105, are common in the art, and are formed to rotationally engage internally threaded portions of other components, such as nuts or internally threaded female components. Special threading is not required by the invention. First fitting 100 further comprises a longitudinal groove 110. Longitudinal groove 110 is formed in the surface of first fitting 100 by machining, routing, or the like, and extends longitudinally from the end of first fitting 100 that is threaded into second fitting 200 along the threaded portion 105 of first fitting 100 towards the other end of first fitting 100. The sides of longitudinal groove 110 are generally vertical relative to the centerline of first fitting 100. The depth and width of longitudinal groove 110 may vary, but must be deep enough and wide enough that if another component is positioned within longitudinal groove 110 and does not move in an outward direction, either side edge of longitudinal groove 110 will prevent that component from rotating relative to first fitting 100 due to the rotational abutment of that component and the side edge of longitudinal groove 110. As will become clear in the description that follows, when locking device 500 of the invention is installed onto first fitting 100, longitudinal groove 110 rotationally engages tab portion 350 of locking support body 300, thereby preventing rotation of locking support body 300 relative to first fitting 100 when locking support body 300 is mounted on first fitting 100.

Locking support body 300 is preferably formed of stainless steel or any other suitable material and is generally annularly shaped and sized to fit on first fitting 100, with its interior diameter being slightly greater than the outer diameter of externally threaded portion 105 on first fitting 100. The inner diameter of locking support body 300 is generally smooth, thus allowing locking support body 300 to slide along first fitting 100 in a longitudinally unobstructed manner when locking support body 300 is mounted on first fitting 100.

As described above, locking support body 300 includes integral tab portion 350. Tab portion 350 extends both inwardly from the inner diameter of locking support body 300 and longitudinally to the left in FIG. 2 towards second fitting 200. The longitudinally extending portion of tab portion 350 extends radially from the inner surface towards the outer surface of locking support body 300. Each of the extending portions of tab portion 350 are generally rectangular in shape, with two generally vertical sides extending outwardly from the surface of locking support body 300. Thus, tab portion 350 extends inwardly from locking support body 300 and fits within longitudinally groove 110 when locking support body 300 is mounted or installed on first fitting 100. The sides of the extending portion of tab portion 350 that extends inwardly from the inner surface of locking support body 300 engage with the sides of longitudinally groove 110 upon application of a rotational force, thereby preventing locking support body 300 from rotating relative to first fitting 100. However, the engagement of tab portion 350 and longitudinally groove 110 does not prevent locking support body 300 from sliding longitudinally along first fitting 100. Instead, when locking support body 300 slides along the length of first fitting 100, tab portion 350 slides along first fitting 100 within longitudinally groove 110.

In addition to tab portion 350, locking support body 300 also preferably includes a plurality of supplemental tab portions 350A. Unlike tab portion 350, supplemental tab portions 350A do not extend inwardly from the inner diameter of locking support body 300. Instead, supplemental tab portions 350A only extend longitudinally from locking support body 300 to the left in FIG. 2 towards second fitting 200. The longitudinally extending portions of tab portions 350A are positioned in a radial manner with the innermost end near the inner surface of locking support body 300. As with tab portion 300, each of the longitudinally extending portions of supplemental tab portions 350A are generally rectangular in shape, with two generally vertical sides extending outwardly from the surface of locking support body 300.

Locking support body 300 also includes a wide recessed portion 370 capable of receiving locking ring element 400. Recessed portion 370 is generally annular in shape and is sized appropriately to allow a locking ring element 400 to fit within recessed portion 370. An outer portion of locking support body 300 surrounds recessed portion 370, longitudinally overlapping the larger diameter portion 410 of locking ring element 400 when locking ring element 400 is positioned within recessed portion 370.

Locking ring element 400, which is preferably a nut or any other suitable device, is formed of stainless steel or any other suitable material. Accordingly, locking ring element 400 is generally annular in shape and includes a smaller diameter portion 405 as well as a larger diameter portion 410. Smaller diameter portion 405 preferably includes a plurality of flat portions that can be gripped for rotation by any known tool, for example, a wrench. Additionally, locking ring element 400 is also internally threaded and sized to threadably engage first fitting 100. The internal threads of locking ring element 400 are preferably special internal threads that, when a sufficient amount of torque is applied to locking ring element 400, become locked in engagement with external threaded portion 110 of first fitting 100. One example of an acceptable locking ring element is the Spiralock® fastener manufacturer by the Spiralock Corporation.

Figure 6:
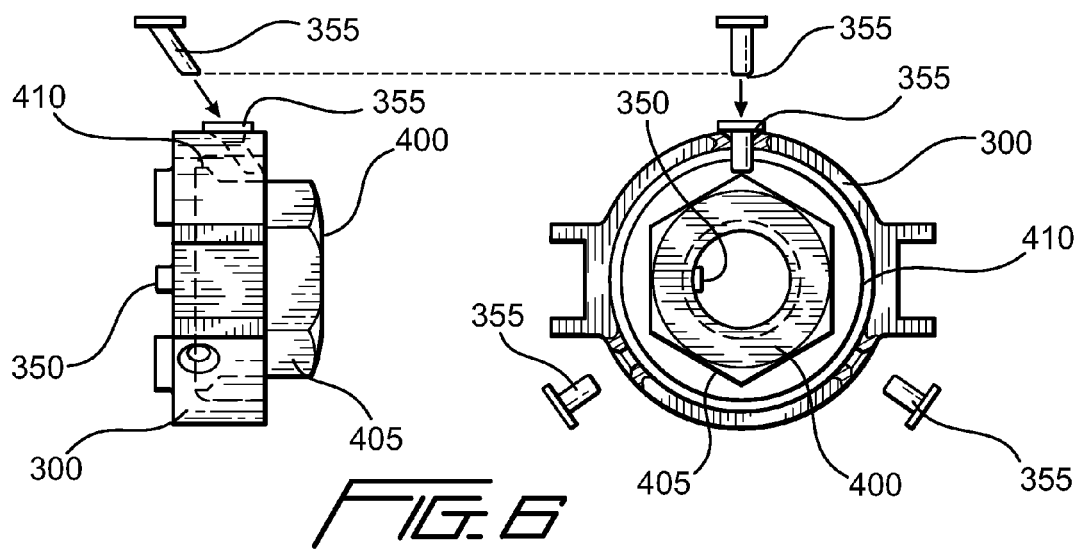
FIG. 6 is a cross-sectional view of the locking device assembly according to one aspect of a preferred embodiment of the invention.

When locking ring element 400 is positioned within recessed portion 370 of locking support body 300, one or more retainer pins 355 are inserted through appropriately sized bores in the outer portion of locking support body 300 surrounding recessed portion 370. As shown in FIG. 6, retainer pins 355 pass through the outer portion of locking support body 300 in a generally transverse manner, and extend into recessed portion 370 sufficiently to radially overlap the larger diameter portion 410 of locking ring element 400. Retainer pins 355 may be secured in place relative to locking support body 300 by any means known in the art, for example, press-fitting. Preferably, at least three retainer pins 355 are used and are evenly spaced around locking support body 300. If locking ring element 400 and locking support body 300 begin to axially separate, retainer pins 355 come into contact with and axially abut the larger diameter portion 410 of locking ring element 400, thereby preventing further separation. Thus, retainer pins 355 prevent locking ring element 400 from exiting recessed portion 370, thereby maintaining locking ring element 400 as an integral part of locking device 500.

Second fitting 200 is generally cylindrical in shape and is formed of steel or any other suitable material. Second fitting 200 has an internal threaded portion 205 that is sized appropriately to rotationally engage external threaded portion 105 of first fitting 100, thereby connecting second fitting 200 to first fitting 100. Additionally, a plurality of slots 210 are formed into the end of second fitting 200. As shown in FIG. 4, slots 210 are generally rectangular recesses formed in the end of second fitting 200 and extend radially outward from the innermost portion of second fitting 200 to the outer edge of second fitting 210. Slots 210 are sized and spaced to receive the longitudinally extending portions of tab portion 350 and supplemental tab portions 350A when second fitting 200 is positioned adjacent to locking support body 300. There must be at least as many slots 210 as there are tab portions to allow adjacent axial positioning between second fitting 200 and locking support body 300 to occur.

The longitudinally extending portions of tab portion 350 and supplemental tab portions 350A are sized, shaped, and positioned appropriately to fit within slots 210 of second fitting 200. As described above, when locking support body 300 is positioned adjacent to second fitting 200, tab portion 350 and supplemental tab portions 350A fit within slots 210. When forces tending to rotate second fitting 200 relative to locking support body 300 are applied, the sides of tab portion 350 and supplemental tab portions 350A abut the sides of slots 210, thereby preventing further rotation. Accordingly, since locking support body 300 cannot rotate relative to first fitting 100 because of the engagement of tab portion 350 and longitudinal groove 110, when slots 210 are engaged with tab portion 350 and supplemental tab portions 350A, second fitting 200 also cannot rotate relative to first fitting 100.

Figure 2:
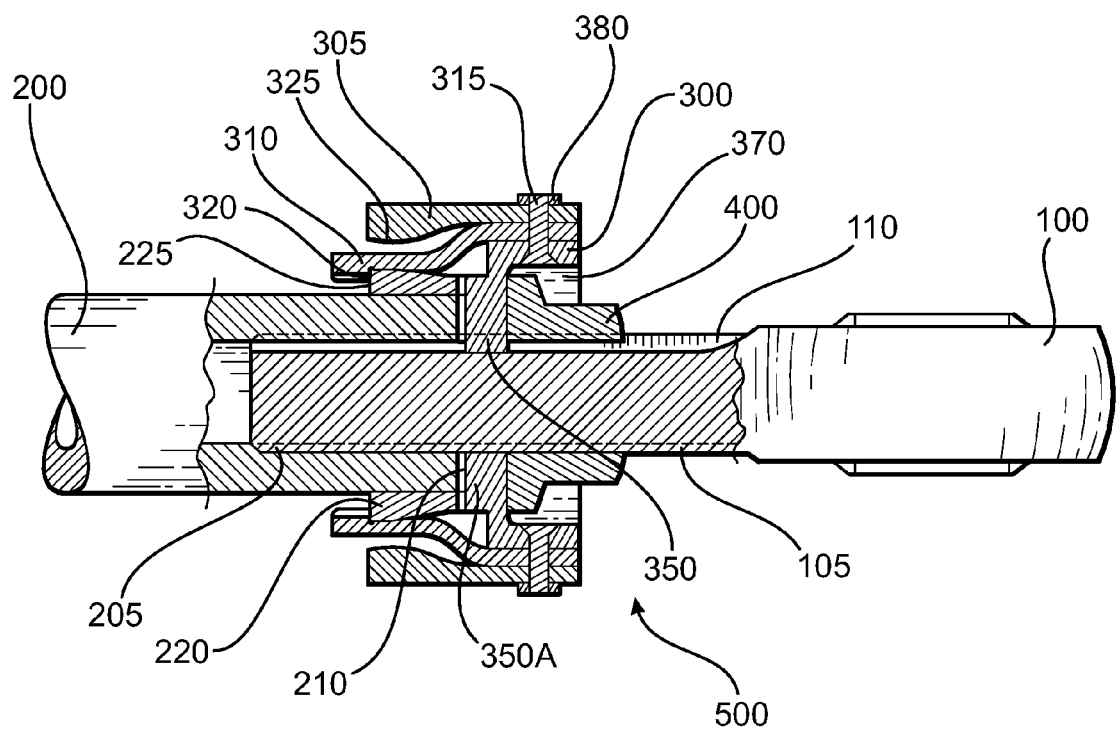
FIG. 2 is a cross-sectional side view of the locking device assembly according to one aspect of a preferred embodiment of the invention as applied to a male rod end.

Moreover, second fitting 200 preferably comprises a generally annularly shaped collar 220 surrounding the outer edge of second fitting 200 in a circumferential manner. Collar 220 is formed of steel or any other suitable material, and may be integral with or permanently affixed to second fitting 200, for example, by press-fitting, as would be desirable when retrofitting the invention to existing fittings. As is shown in FIG. 2, collar 220 includes a larger extent or diameter portion terminating at an edge portion 225 and a smaller extent or diameter portion at an opposite end near the end of second fitting 200. In the exemplary embodiments shown in FIGS. 1–14, a portion of collar 220 is frustoconically shaped. Edge portion 225 preferably comprises a radial surface extending outward from the surface of second fitting 200 capable of longitudinal abutment relative to the centerline of second fitting 200. According to the exemplary embodiments, edge portion 225 is preferably formed integrally with collar 220. However, the edge portion 225 instead may be formed directly on the surface of second fitting 200, with collar 220 being omitted entirely.

According to a preferred embodiment shown in FIGS. 1–3, 5, 7, and 8, locking device 500 comprises at least one fastening member 310. Fastening member 310 is formed of metal, for example spring steel, plastic, for example a polyamide or nylon, or any other suitable material that has good strength and a sufficient amount of flexibility. One end of fastening member 310 extends longitudinally outward from locking support body 300 towards second fitting 200. As locking support body 300 is moved axially closer to axial second fitting 200 during assembly, fastening member 310 comes into contact with the outer surface of collar 220. As locking support body 300 and second fitting 200 continue to move closer to adjacency, fastening member 310 flexes outwardly along the frustoconically inclined surface of collar 200 until, immediately prior to achieving adjacency between locking support body 300 and second fitting 200 as described above, a fastening member lip portion 320 of fastening member 310 slides over edge portion 225 of collar 220 and snaps inwardly until fastening member 310 is radially adjacent to collar 220. In this locked position, fastening member lip portion 320 extends radially inward from the inner surface of fastening member 310, and is positioned such that, when an axial force acts to separate locking support body 300 from second fitting 200, fastening member lip portion 320 comes into contact with and axially abuts edge portion 225, thereby preventing further axial movement.

While the exemplary embodiments describe fastening member lip portion 320 as being generally perpendicular relative to the longitudinal axis of second fitting 200, fastening member lip portion 320 may be formed at any transverse angle that enables fastening member lip portion 320 to axially engage edge portion 225 sufficiently to prevent axial movement of fastening member lip portion 320 over edge portion 225. Similarly, edge portion 225 may be formed at any transverse angle that enables edge portion 225 to axially engage fastening member lip portion 320.

Figure 7:
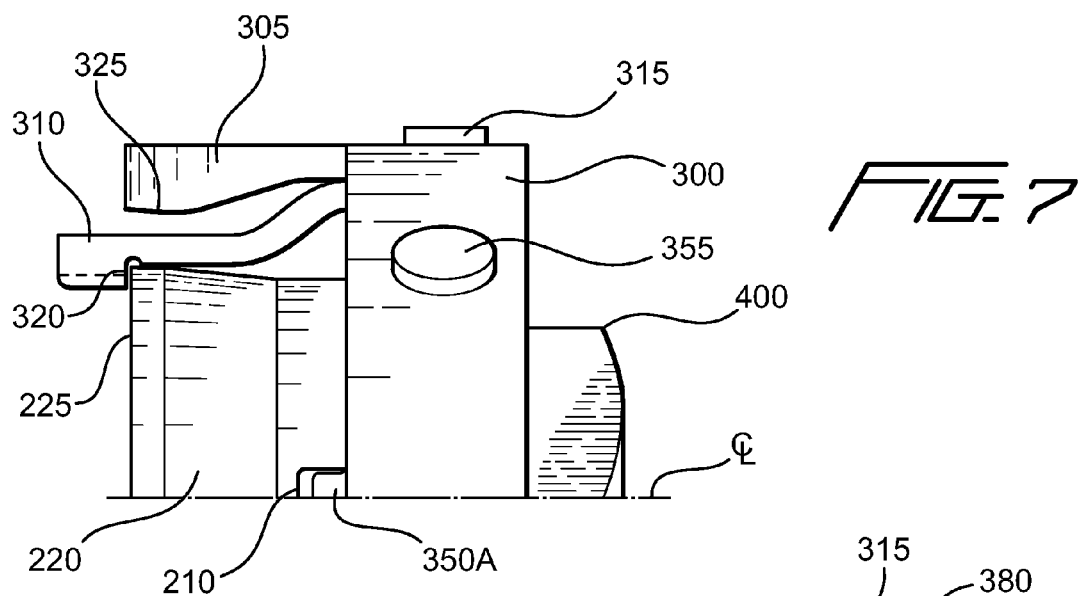
FIG. 7 is a magnified side view of the locking device assembly according to one aspect of a preferred embodiment of the invention.

As described above, fastening member 310 is preferably of a sufficient length to allow fastening member lip portion 320 to overlap edge portion 225 when second fitting 200 is longitudinally adjacent to locking support body 300. The existence of a gap between fastening member lip portion 320 and edge portion 225 helps to ensure the existence of a positive engagement between fastening member lip portion 320 and edge portion 225. As is shown in FIG. 7, the extent of the overlapping area should be significantly less than, for example one-third of, the axial length of engagement between slots 210 and the corresponding longitudinal extending portions of tab portion 350 and supplemental tab portions 350A. Thus, if locking support body 300 begins to axially separate from second fitting 200, the axial abutment between fastening member lip portion 320 and edge portion 225 will occur prior to the disengagement of slots 210 with tab portion 350 and supplemental tab portions 350A. This arrangement ensures that second fitting 200 cannot rotate relative to locking support body 300 if fastening member lip portion 320 axially abuts or longitudinally overlaps edge portion 225 as described above.

The other end of fastening member 310 extends over and is connected to locking support body 300. According to the exemplary embodiments in FIGS. 1–3, 5, 7, and 8, fastening member 310 is connected to locking support body 300 with a bolt 315, which originates in recessed portion 370 and extends outwardly through an appropriately sized bored in locking support body 300 and fastening member 310. After assembly, a nut 380 is secured to the end of bolt 315 to hold fastening member 310 in place relative to locking support body 300. In the alternative, bolt 315 and nut 380 may be replaced with a rivet or any other suitable connector. If a rivet is installed as a substitute for bolt 315 and nut 380, the end of the rivet that extends through the appropriately sized bore in locking support body 300 and fastening member 310 is bucked to form a second head on the rivet, thereby securing fastening member 310 in place relative to locking support body 300. Additionally, fastening member 310 may be secured to locking support body 300 by any other suitable means.

In addition to fastening member 310, locking support body 300 also preferably comprises a shelf element 305. Shelf element 305 is preferably formed of stainless steel or any other suitable rigid material and is positioned radially outward of fastening member 310. When locking support body 300 is longitudinally adjacent to second fitting 200, one end of shelf element 305 extends in an overlapping manner over fastening member 310 and second fitting 200. The innermost edge of shelf element 305, stop portion 325, is positioned radially outward from the outermost edge of fastening member 310. When fastening member 310 flexes over edge portion 225 during assembly as described above, the outermost edge is preferably nearly adjacent to stop portion 325, with only a small gap existing between the components. Stop portion 325 on shelf element 305 serves to prevent fastening member from flexing outwardly in an excessive manner. Thus, if a radial force were to attempt to flex fastening member 310 outward in an excessive manner, fastening member 310 would radially abut stop portion 325 and prevent excessive outward flexing. While shelf element 305 and stop portion 325 are not essential to the function of the invention, the existence of a stop serves to preserve the integrity of fastening member 310 and prevent weakening of fastening member 310 due to excessive flexing.

Moreover, the other end of shelf element 305 extends over locking support body 300 generally parallel to fastening member 310. Upon assembly, shelf element 305 is mounted to locking support body 300 with bolt 315, which, as described above, extends outwardly through an appropriately sized bore in locking support body 300 and fastening member 310. When shelf element 305 is included, nut 380 is secured to the portion of bolt 315 extending through shelf element 305 to secure both shelf element 305 and fastening member 310 to locking support body 300. In the alternative, shelf element 305 may be secured to fastening member 310 and locking support body 300 by any other suitable means. For example, shelf element 305 and fastening member 310 may be secured to locking support body 300 by a single rivet instead of the bolt and nut combination described above. In this case, shelf element 305 and fastening member 310 may be press-fit into a channel segment of locking support body 300, thereby preventing any lateral motion of shelf element 305 and fastening member 310 relative to locking support body 300.

Now referring to FIG. 3, locking device 500 is installed or assembled as follows. First, locking ring element 400 is threaded onto first fitting 100. Because locking ring element 400 is positioned within recessed portion 370 of locking support body 300, as locking ring element 400 is threaded upwards onto first fitting 300, locking device 500 is simultaneously slidably moved onto first fitting 100, with tab portion 350 being positioned within longitudinal groove 110. After locking ring element 400 and locking support body 300 are positioned as desired on first fitting 100, second fitting 200 is threaded onto first fitting 100 until appropriate positioning of second fitting 200 relative to first fitting 100 is achieved. At that time, second fitting 200 is rotationally adjusted as necessary to position any of slots 210 in longitudinal alignment with longitudinal groove 110. This is done to ensure that, when locking support body 300 is adjacent to second fitting 200, tab portion 350, which is positioned within longitudinal groove 110, will also engage one of slots 210. Next, locking ring element 400 is threaded back down first fitting 100 towards second fitting 200. As described above, as locking ring element 400 moves along first fitting 100 towards second fitting 200, locking support body 300 is also slidably moved along first fitting 100 towards second fitting 200. As locking ring element 400 and locking support body 300 approach second fitting 200, fastening member 310 comes into contact with collar 220. As movement continues, fastening member 310 flexes outwardly along the outer surface of collar 220 in response to the increased diameter of collar 220. When locking support body 300 nears adjacency with second fitting 200, tab portion 350 and supplemental tab portions 350A enter into engagement with slots 210. If necessary, minor rotational adjustments can be made to second fitting 200 to ensure a proper positioning of tab portion 350 and supplemental tab portions 350A within slots 210. Just prior to locking support body 300 and second fitting 200's adjacency, fastening member lip portion 320 will overlap edge portion 225 and snap into position, as described above. Finally, locking ring element 400 is tightly secured against locking support body 300 with sufficient torque to activate the self-locking threads, as described above.

Figure 9:
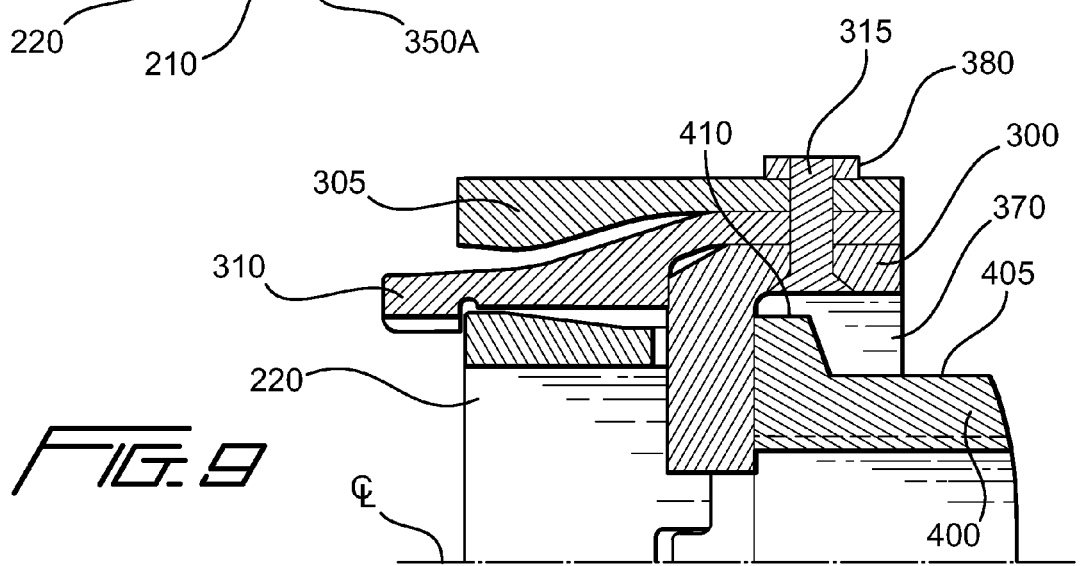
FIG. 9 is a magnified side view of the locking device assembly according to one aspect of a preferred embodiment of the invention.
Figure 12:
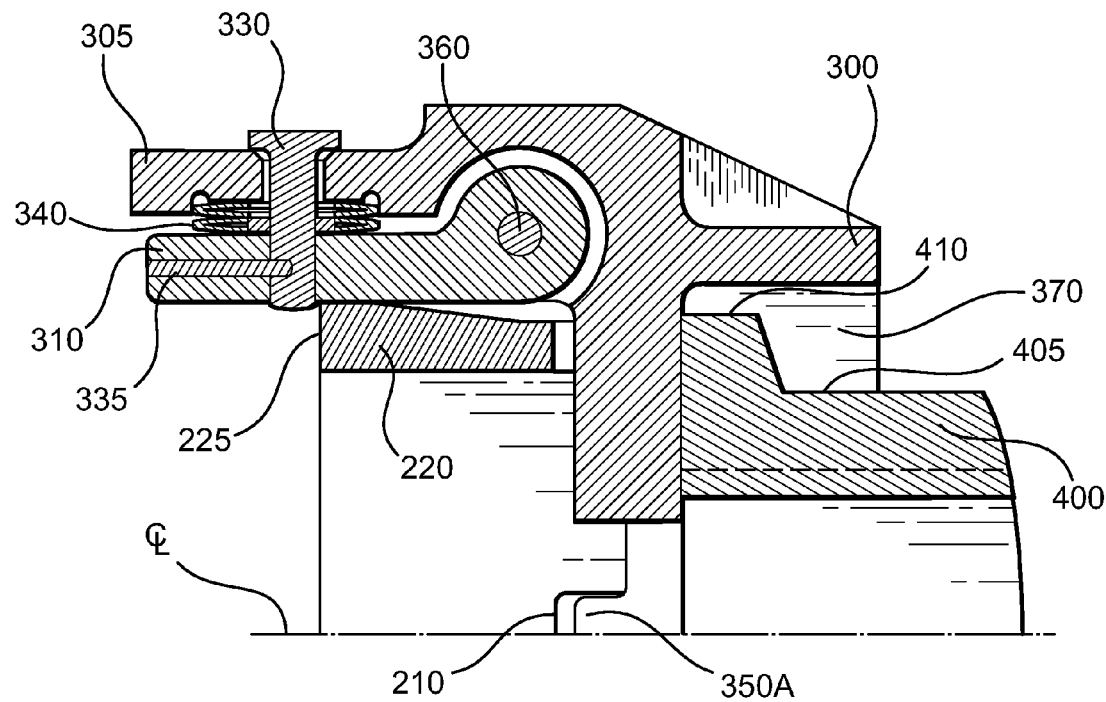
FIG. 12 is a magnified cross-sectional side view of the locking device assembly according to one aspect of a preferred embodiment of the invention.
Figure 13:
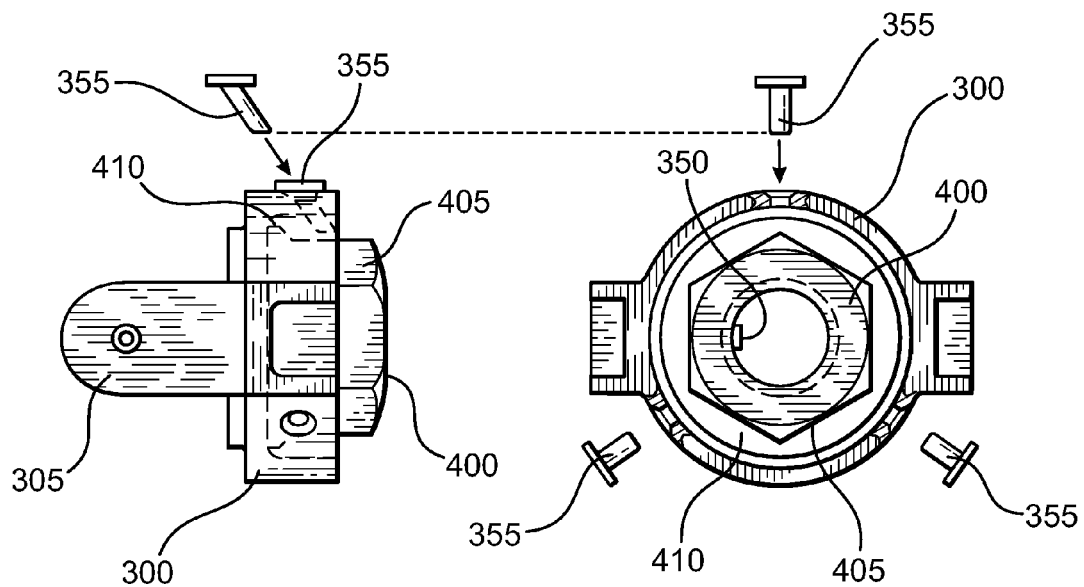
FIG. 13 is a cross-sectional view of the locking device assembly according to one aspect of a preferred embodiment of the invention.
Figure 14:
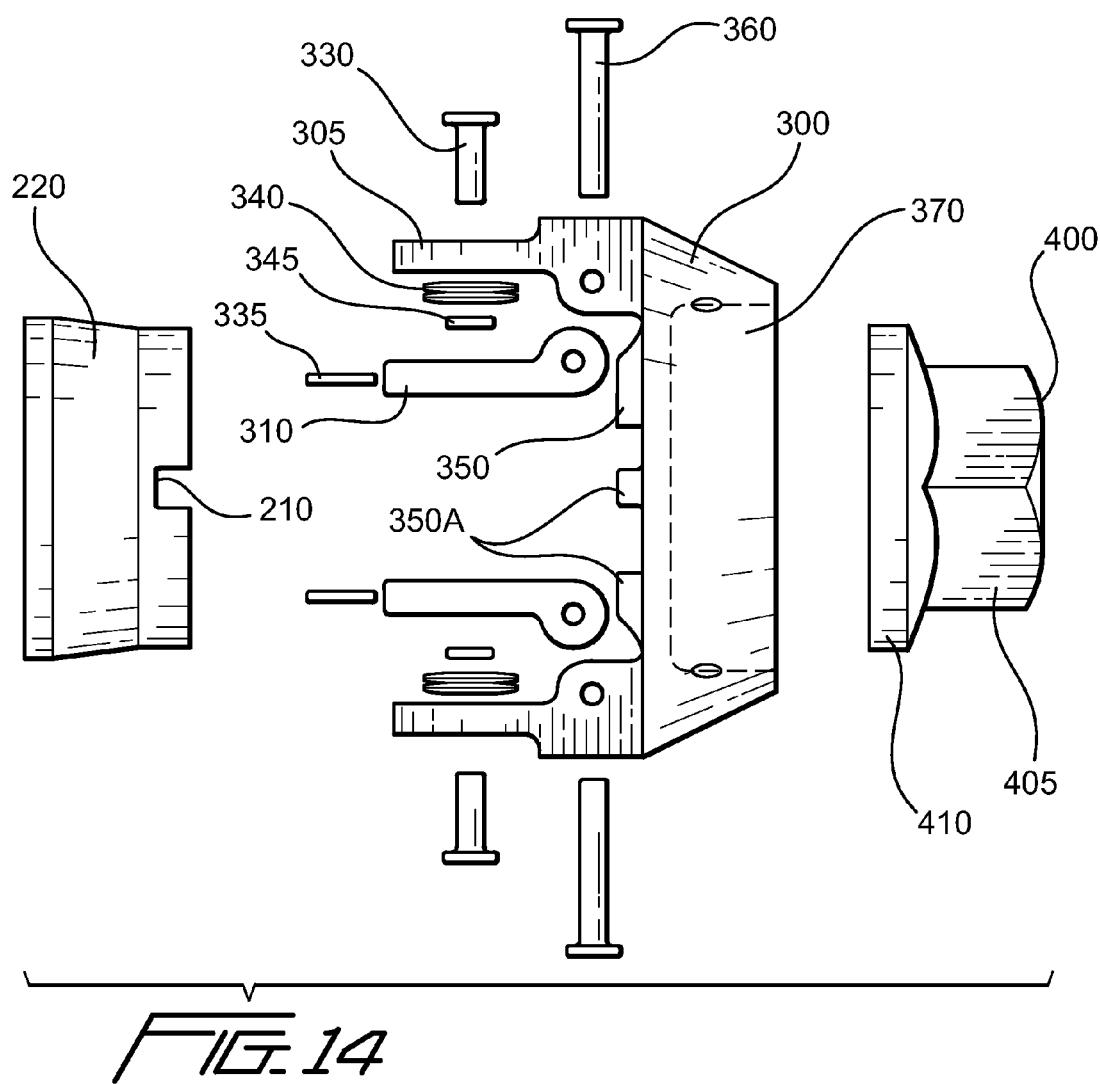
FIG. 14 is an exploded side view of the locking device assembly according to one aspect of preferred embodiment of the invention.
Figure 18:
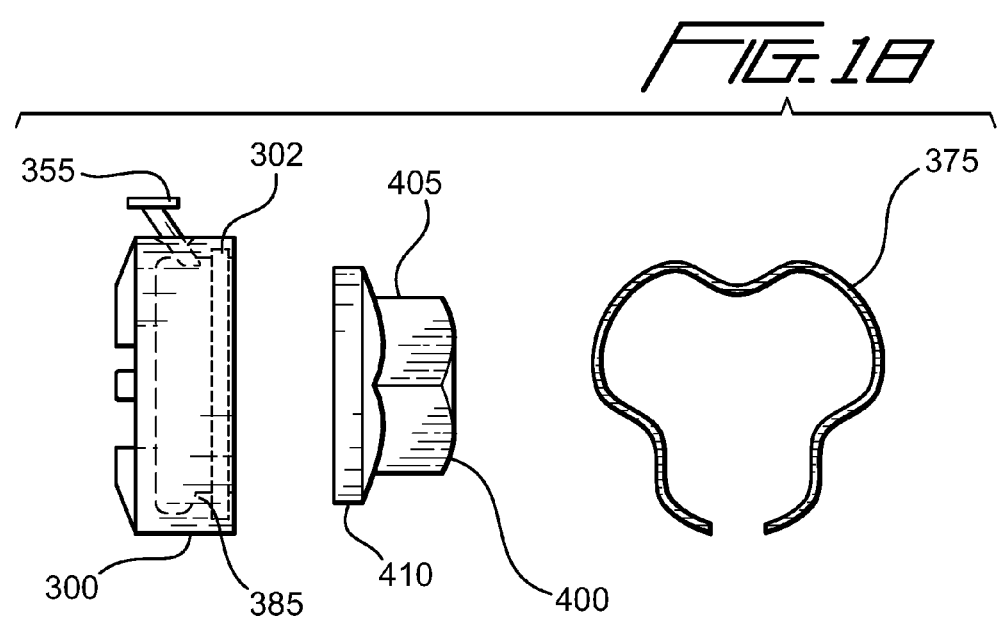
FIG. 18 is an exploded view of the locking ring element and locking support body according to one aspect of a preferred embodiment of the invention.

As shown in FIG. 9, a preferred embodiment of the invention includes the features described above, with the exception that fastening member 310 is modified slightly. According to this preferred embodiment, fastening member 310 is formed to include an enlarged center portion 390 that extends inwardly from fastening member 310 towards locking support body 300. When fastening member 310 is mounted onto locking support body 300 with bolt 315 and nut 380 as described above, enlarged center portion 390 axially abuts locking support body 300. This ensures that fastening member 310 is positioned properly axially relative to second fitting 200. More specifically, the axial adjacency of enlarged center portion 390 and locking support body 300 ensures that fastening member lip portion 320 overlaps edge portion 225 the proper amount to ensure full functionality of the invention.

As shown in FIG. 10, a preferred embodiment of the invention includes the features described above, with the exception that fastening member 310 and shelf element 305 are formed integrally with each other. According to this embodiment, shelf element 305 is integral with fastening member 310. One end of the modified fastening member is secured to locking support body 300 by bolt 315 and nut 380 as described above. The other end is split between fastening member 310 and shelf element 305. Stop portion 325 of shelf element 305 acts as a stop to prevent fastening element 310 from flexing excessively outward. During operation, fastening member lip portion 320 overlaps and axially abuts edge portion 225 as described above.

As shown in FIGS. 11–14, a preferred embodiment of the invention includes the features described above, with the exception that the fastening member and shelf element arrangement has been modified. According to this embodiment, fastening member 310 is connected to the assembly and biased inwardly in a different manner than the previous embodiments. Fastening member 310 is formed of an inflexible material, for example steel or the like. While fastening member 310 remains positioned between shelf element 305 and second fitting 200, fastening member 310 is pivotably connected to a modified shelf element 305 by a hinge pin 360, which passes through an appropriately sized bore in each of fastening member 310 and shelf element 305. As described above, it is preferred that fastening member 310 snap inwardly over edge 225, thereby creating a positive axial engagement upon attempted axial separation. To achieve the inward movement of fastening member 310 after overlapping edge portion 225 in this embodiment, fastening member 310 is biased away from shelf element 305 and towards second fitting 200 with a spring configuration. In particular, a stop pin 330 extends inwardly through an appropriately sized bore in shelf element 305. Then, a plurality of spring washers 340 are stacked in series around stop pin 330. A spacer 345 or other conventional means may be used to keep spring washers 340 properly aligned around stop pin 330. After spring washers 340 are positioned, fastening member 310 is pivoted onto the end of stop pin 330, with the end of stop pin 330 extending through an appropriately sized bore in fastening member 310, preferably, as a press-fit. Stop pin 330 preferably extends through fastening member 310 and past the inward edge of fastening member 310 to form a lip portion that extends generally parallel to edge portion 225. This lip portion acts as a substitute for fastening member lip portion 320 in the previous embodiments and has the same functionality. Specifically, the lip portion of stop pin 330 is capable of achieving longitudinal abutment with edge portion 225. After stop pin 330 is positioned appropriately, a pin element 335 is inserted through, and secured within, an appropriately sized bore in fastening member 310 into stop pin 330, thereby preventing stop pin 330 from becoming disengaged from either shelf element 305 or fastening member 310. Thus, the configuration of spring washers 340 acts as a spring element and biases fastening member 310 away from shelf element 305, and when the lip portion of stop pin 330 passes over edge portion 225, causes fastening member 310 to move inwardly, thereby placing the lip portion of stop pin 330 into position for axial abutment with edge portion 225 if a longitudinal force acts to separate second fitting 200 from locking support body 300.

As shown in FIGS. 15–18, a preferred embodiment of the invention includes an actuator piston and rod-end locking assembly for locking two fittings together, the locking assembly comprising first fitting 100, second fitting 200, locking support body 300, and locking ring element 400, each of which have been described above in great detail. However, according to this embodiment of the invention, locking ring element 400 is retained within recessed portion 370 of locking support body 300 in an alternative method, and the use of shelf element 305 and fastening member 310 is not necessary to lock first fitting 100 to second fitting 200.

According to this aspect of a preferred embodiment, a spring 375 is used to prevent inadvertent rotation of locking ring element 400 within recessed portion 370, and thus, to prevent separation of locking ring element 400 from locking support body 300, and locking support body 300 from second fitting 200. Spring 375 is preferably an expansion spring, such as a "Marcel Expansion Spring", as is known in the art, and is formed of stainless steel, spring steel, or the like. Spring 375 is made of a square or circular spring that is shaped into a generally round spring element with a sine wave pattern. As is shown in FIG. 17, the innermost portions of each sine wave of spring 375 contact smaller diameter portion 405 of locking ring element 400, and the outermost portions of each sine wave of spring 375 contact the inner surface of locking support body 300, and are preferably fitting within a circumferential groove 302 formed in the inner surface of locking support body 300 facing recessed portion 370. Groove 302 preferably extends the entire circumference of the innermost portion of locking support body 300 facing recessed portion 370. The number of faces on smaller diameter portion 405 of locking ring element 400 is relative to the number of sine waves on spring 375, for example, three, four, or five.

After locking ring element 400 is positioned within recessed portion 370, spring 375 is inserted into recessed portion 370 such that the lowermost portions of the sine waves of spring 375 are in contact with the faces of smaller diameter portion 405 and the outermost portions of the sine waves of spring 375 are positioned within groove 302. Because the outermost portions of the sine waves of spring 375 are positioned within groove 302, longitudinal movement of spring 302 relative to first fitting 100 is prevented. The inclusion of spring 375 as a locking ring element 400 retention device prevents inadvertent rotation of locking ring element 400 relative to locking support body 300. In particular, the inward force of spring 375 against locking ring element 400 is sufficient to prevent rotation due to operational forces, such as vibrations, etc. However, the spring forces of spring 375 may be overcome manually during installation by using a tool, such as a wrench, to rotate locking ring element 400.

Moreover, locking support body 300 preferably includes rotational limit stop 385 within recessed portion 370. Rotational limit stop 385 is formed onto the interior diameter locking support body 300 and extends inwardly into recessed portion 370. As is shown in FIG. 17, rotational limit stop 385 has both radial and longitudinal limit stop functionality. In particular, rotational limit stop 385 serves to prevent spring 375 from rotating relative to locking support body 300. Thus, if locking ring element 400 begins to rotate relative to locking support body 300 for any reason, spring 375 will also begin to rotate. However, when the end of spring 375 rotates into contact with rotational limit stop 385, further rotation of spring 375 is prevented. Accordingly, locking ring element 400 must overcome the inward spring forces of spring 375 to continue rotation. As described above, locking ring element 400 does not overcome the inward forces of spring 375 during operation. Thus, rotation of locking ring element 400 is prevented.

In addition, longitudinal separation between locking ring element 400 and locking support body 300 is prevented by a second limit stop, longitudinal limit stop 386, as well as the longitudinal limit stop portion of rotational limit stop 385. As is shown in FIG. 17, longitudinal limit stop 386 is formed onto the interior diameter locking support body 300 and extends inwardly into recessed portion 370. Each of longitudinal limit stop 386 and rotational limit stop 385 extend sufficiently inward to longitudinally abut the leading edge of larger diameter portion 410 of locking ring element 400 if forces act to separate locking ring element 400 from locking support body 300. Thus, locking ring element 400 is retained within recessed portion 370 of locking support body 300. In addition, longitudinal limit stop 386 and rotational limit stop 385 serve to spring 375 from longitudinal contact with locking ring element 400, thereby protecting the integrity of spring 375 and preventing locking ring element 400 from pushing spring 375 out of groove 302 and recessed portion 370.

In light of the above disclosure of the invention, it is clear that the invention provides a locking device comprising a plurality of locking features that can be used alone and/or in combination to prevent separation of a first fitting from a second fitting. One locking feature of the invention is comprised of the rotational engagement of tab portion 350 with longitudinally groove 110 to prevent rotation of locking support body 300 relative to first fitting 100. Another locking feature of the invention is comprised of the rotational engagement between slots 210 and either or both of tab portion 350 and supplemental tab portions 350A to prevent rotation of second fitting 200 relative to locking support body 300. A further locking feature of the invention is comprised of the axial abutment of fastening member lip portion 320 and edge portion 225, thereby preventing axial separation of second fitting 200 from locking support body 300. An additional locking feature comprises prevention of axial separation between locking ring element 400 and locking support body 300 by using retainer pins 355 to retain locking ring element 400 within recessed portion 370 of locking support body 300. Each of the above locking features can be used alone and/or in combination with one or more of the other locking features to create a robust locking device.

It will thus be seen that the objects set forth above, among those made apparent from the preceding description, are efficiently attained and, since certain changes may be made, in carrying out the above processes, in a described instrument, and in the construction set forth, without departing from the spirit and scope of the invention, it is intended that all matter contained in the above description shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall there between.

I claim:

1. An actuator piston and rod-end locking device for locking a first fitting to a second fitting, the first fitting including a longitudinal groove and an exterior threaded portion, the device comprising:
    a locking support body slidably mounted on the first fitting, said locking support body positioned in engagement with the second fitting to prevent rotation of the second fitting;
    a shelf element mounted on said locking support body, said shelf element extending over the second fitting;
    a fastening member mounted on said shelf element and interposed radially between said shelf element and the second fitting, said fastening member capable of pivotal movement relative to said shelf element, wherein said fastening member pivots relative to said shelf element into engagement with the second fitting to secure said locking support body to the second fitting;
    a locking ring element including locking threads, said locking ring element being threadably and rotationally locked onto said first fitting, wherein a locking engagement between said locking threads of said locking ring element and the exterior threaded portion of the first fitting results in said threadably and rotationally locked configuration of said locking ring element and the first fitting, wherein said locking support body is positioned between said locking ring element and the second fitting such that said locking ring element prevents axial separation between said locking support body and the second fitting upon an application of axial force tending to separate said first fitting from said second fitting; and
    a means for biasing said fastening member away from said shelf element.

2. The actuator piston and rod-end locking device of claim 1 wherein said means for biasing said fastening member away from said shelf element comprises a plurality of spring washers stacked in series between said fastening member and said shelf element.

3. The actuator piston and rod-end locking device of claim 1 wherein said fastening member is integral with said locking support body.

4. An actuator piston and rod-end locking assembly for locking two fittings together, the locking assembly comprising:
    a first fitting including a longitudinal groove and an exterior threaded portion;
    a second fitting, said second fitting connected to said first fitting;
    a locking support body slidably mounted on said first fitting, said locking support body positioned in engagement with said second fitting to prevent rotation of said second fitting;
    a shelf element mounted on said locking support body, said shelf element extending over said second fitting;
    a fastening member mounted on said shelf element and interposed radially between said shelf element and said second fitting, said fastening member capable of pivotal movement relative to said shelf element, wherein said fastening member pivots relative to said shelf element into engagement with said second fitting to secure said locking support body to said second fitting;
    a locking ring element including locking threads, said locking ring element being threadably and rotationally locked onto said first fitting, wherein a locking engagement between said locking threads of said locking ring element and said exterior threaded portion of said first fitting results in said threadably and rotationally locked configuration of said locking ring element and said first fitting, wherein said locking support body is positioned between said locking ring element and said second fitting such that said locking ring element prevents axial separation between said locking support body and said second fitting upon an application of axial force tending to separate said first fitting from said second fitting; and
    a means for biasing said fastening member away from said shelf element.

5. The actuator piston and rod-end locking assembly of claim 4 wherein said means for biasing said fastening member away from said shelf element comprises a plurality of spring washers stacked in series between said fastening member and said shelf element.

6. The actuator piston and rod-end locking assembly of claim 4 wherein said fastening member is integral with said locking support body.

7. An actuator piston and rod-end locking assembly for locking two fittings together, the locking assembly comprising:
    a first fitting including an exterior threaded portion and a longitudinal groove;
    a second fitting including an interior threaded portion and an edge portion, said second fitting threadably connected to said first fitting via said interior threaded portion;
    a locking support body slidably mounted on said first fitting, said locking support body positioned in engagement with said second fitting to prevent rotation of said second fitting;

a shelf element mounted on said locking support body, said shelf element extending over said second fitting;

a fastening member mounted on said shelf element and interposed radially between said shelf element and the second fitting to overlap said edge portion of said second fitting, said fastening member capable of pivotal movement relative to said shelf element, wherein said fastening member pivots relative to said shelf element into axial engagement with said edge portion of said second fitting to secure said locking support body to said second fitting;

a locking ring element including locking threads, said locking ring element being threadably and rotationally locked onto said first fitting, wherein a locking engagement between said locking threads of said locking ring element and the exterior threaded portion of said first fitting results in said threadably and rotationally locked configuration of said locking ring element and said first fitting, wherein said locking support body is positioned between said locking ring element and said second fitting such that said locking ring element prevents axial separation between said locking support body and said second fitting upon an application of axial force tending to separate said first fitting from said second fitting; and a means for biasing said fastening member away from said shelf element.

8. The actuator piston and rod-end locking assembly of claim 7 wherein said means for biasing said fastening member away from said shelf element comprises a plurality of spring washers stacked in series between said fastening member and said shelf element.

9. The actuator piston and rod-end locking assembly of claim 7 wherein said fastening member is integral with said locking support body.

10. An actuator piston and rod-end locking device for locking a first fitting including an exterior threaded portion and a longitudinal groove to a second fitting including an interior threaded portion and an edge portion, the second fitting being threadably connected to the first fitting via the interior threaded portion, the locking device comprising:

a locking support body slidably mounted on the first fitting, said locking support body positioned in engagement with the second fitting to prevent rotation of the second fitting;

a shelf element mounted on said locking support body, said shelf element extending over the second fitting;

a fastening member mounted on said shelf element and interposed radially between said shelf element and the second fitting to overlap the edge portion of the second fitting, said fastening member capable of pivotal movement relative to said shelf element, wherein said fastening member pivots relative to said shelf element into engagement with the edge portion of the second fitting to secure said locking support body to the second fitting;

a locking ring element including locking threads, said locking ring element being threadably and rotationally locked onto the first fitting, wherein a locking engagement between said locking threads of said locking ring element and the exterior threaded portion of the first fitting results in said threadably and rotationally locked configuration of said locking ring element and the first fitting, wherein said locking support body is positioned between said locking ring element and the second fitting such that said locking ring element prevents axial separation between said locking support body and the second fitting upon an application of axial force tending to separate said first fitting from the second fitting; and a means for biasing said fastening member away from said shelf element.

11. The actuator piston and rod-end locking device of claim 10 wherein said means for biasing said fastening member away from said shelf element comprises a plurality of spring washers stacked in series between said fastening member and said shelf element.

12. The actuator piston and rod-end locking device of claim 10 wherein said fastening member is integral with said locking support body.

13. An actuator piston and rod-end locking assembly for locking two fittings together, the locking assembly comprising:

a first fitting including an exterior threaded portion and a longitudinal groove;

a second fitting including an interior threaded portion, said second fitting threadably connected to said first fitting via said interior threaded portion;

a locking support body slidably mounted on said first fitting, said locking support body positioned in engagement with said second fitting, wherein said locking support body includes a recessed portion that extends longitudinally along the first fitting away from the second fitting;

a locking ring element including locking threads, said locking ring element being threadably and rotationally locked onto said first fitting and positioned within said recessed portion of said locking support body, wherein a locking engagement between said locking threads of said locking ring element and said exterior threaded portion of said first fitting results in said threadably and rotationally locked configuration of said locking ring element and said first fitting, wherein said locking support body is positioned between said locking ring element and said second fitting such that said locking ring element prevents axial separation between said locking support body and said second fitting upon an application of axial force tending to separate said first fitting from said second fitting; and an expansion spring positioned around said locking ring element within said recessed portion, said expansion spring being adapted to prevent inadvertent rotation of said locking ring element within said recessed portion.

14. The locking assembly of claim 13 wherein said locking ring element is positioned within a recessed portion of said locking support body.

15. The locking assembly of claim 14 wherein said locking ring element is retained within said recessed portion of said locking support body by one or more retaining pins.

16. The locking assembly of claim 14 wherein said locking ring element is retained within said recessed portion of said locking support body by an expansion spring.

* * * * *